(12) United States Patent  (10) Patent No.: US 7,976,594 B2
Roychoudhury et al.  (45) Date of Patent: Jul. 12, 2011

(54) METHOD AND SYSTEM FOR VAPORIZATION OF LIQUID FUELS

(75) Inventors: Subir Roychoudhury, Madison, CT (US); Maxim Lyubovsky, Alexandria, VA (US); Jonathan Berry, Simpsonville, SC (US)

(73) Assignee: Precision Combustion, Inc., North Haven, CT (US)

( * ) Notice: Subject to any disclaimer, the term of this patent is extended or adjusted under 35 U.S.C. 154(b) by 908 days.

(21) Appl. No.: 11/974,988

(22) Filed: Oct. 16, 2007

(65) Prior Publication Data

US 2008/0127553 A1  Jun. 5, 2008

Related U.S. Application Data

(63) Continuation-in-part of application No. 10/902,512, filed on Jul. 29, 2004, now abandoned.

(60) Provisional application No. 60/491,604, filed on Jul. 31, 2003.

(51) Int. Cl.
*C10K 3/02* (2006.01)

(52) U.S. Cl. ........................................ 48/197 R; 48/219

(58) Field of Classification Search ...... 48/197 R–197 A
See application file for complete search history.

(56) References Cited

U.S. PATENT DOCUMENTS

| | | | |
|---|---|---|---|
| 3,978,836 A | 9/1976 | Noguchi | 123/550 |
| 4,255,121 A | 3/1981 | Sugimoto | 431/208 |
| 4,381,187 A | 4/1983 | Senderquist | 48/212 |
| 5,051,241 A | 9/1991 | Pfefferle | 422/180 |
| 5,725,151 A | 3/1998 | Hetrick | |
| 6,491,236 B1 | 12/2002 | Keller | |
| 6,746,657 B2 | 6/2004 | Castaldi | |
| 6,767,518 B2 | 7/2004 | Ichikawa | |
| 2003/0154654 A1 | 8/2003 | Goebel | 48/198.3 |
| 2003/0159354 A1* | 8/2003 | Edlund et al. | 48/127.9 |
| 2004/0098969 A1 | 5/2004 | Lyubovsky | |
| 2004/0209205 A1 | 10/2004 | Gomez | |
| 2005/0081444 A1 | 4/2005 | Anumakonda | 48/214 |
| 2006/0233702 A1* | 10/2006 | Lyubovsky et al. | 423/651 |
| 2007/0151154 A1 | 7/2007 | Lyubovsky | |
| 2008/0078175 A1 | 4/2008 | Roychoudhury | |
| 2009/0113889 A1 | 5/2009 | Roychoudhury | |

FOREIGN PATENT DOCUMENTS

WO  WO 2004060546 A2  7/2004

OTHER PUBLICATIONS

Co-pending U.S. Appl. No. 12/587,593, filed Oct. 8, 2009, in the names of Subir Roychoudhury, et al.; unpublished.
Co-pending U.S. Appl. No. 12/655,702, filed Jan. 6, 2010, in the names of Subir Roychoudhury, et al.; unpublished.
Co-pending U.S. Appl. No. 12/655,703, filed Jan. 6, 2010, in the names of Subir Roychoudhury, et al.; unpublished.

* cited by examiner

*Primary Examiner* — Alexa D Neckel
*Assistant Examiner* — Imran Akram
(74) *Attorney, Agent, or Firm* — Robert L. Rispoli

(57) ABSTRACT

A method and a system for the vaporization of a liquid fuel is provided and includes providing a supply of a liquid fuel and an oxidant, atomizing the liquid fuel and mixing it with the oxidant, vaporizing the fuel in thermal radiation, catalytically reacting the fuel oxidant mixture, and providing an ignition source for initiating the catalytic reaction. A hydrocarbon fuel can be mixed with oxygen, as a constituent of air, preferably forming a fuel rich fuel air mixture that passes through a catalytic reactor having an ultra-short channel length metal monolith substrate. The fuel air mixture is vaporized and partially oxidized.

13 Claims, 2 Drawing Sheets

METHOD AND SYSTEM FOR VAPORIZATION OF LIQUID FUELS

CROSS-REFERENCE TO RELATED APPLICATION

This application is a continuation in part of U.S. patent application Ser. No. 10/902,512 filed Jul. 29, 2004, now abandoned; which in turn claimed the benefit of U.S. Provisional Application No. 60/491,604 filed Jul. 31, 2003.

BACKGROUND OF THE INVENTION

1. Field of the Invention

The present invention is directed to a method and system for the process of reactively converting a liquid fuel into a gasified stream. The method and system of the present invention also provide a means for quickly starting and operating the process at a variety of inlet conditions including ambient inlet conditions. More particularly, the method and system include the steps of atomizing a liquid fuel, mixing the atomized fuel with an oxidizer in fuel rich proportions, partially vaporizing the fuel and passing the resulting stream through a catalyst bed. The catalyst bed can be suitable for supporting partial oxidation/reforming reactions at high space velocity and can be integrated with an ignition source to initiate the reaction. One embodiment results in an integrated system comprised of a fuel injector, mixer, vaporizer, catalytic-reactor, and igniter, and represents a simplified fuel preparation/gasification and reformation approach reducing the predisposition to coking, especially with liquid fuels.

The method of the present invention can be used in applications where gasification of long chain hydrocarbons is required or desired to improve performance. These pre-reforming reactors can be integrated directly with fuel cells, IC engines or burners. For example, soot and coke are often byproducts of long chain hydrocarbon combustion, such as in diesel engines. Soot is formed when liquid droplets of diesel fuel are combusted prior to vaporization. Application of this method will allow pre-vaporization and partial pre-reforming of diesel fuel prior to combustion. Pre-reforming, as used herein, describes the stage of reforming of a hydrocarbon fuel prior to combustion of that fuel, as described herein, in comparison to some other mechanism that may commonly be referred to as reforming of a fuel.

The integrated fuel injector/mixer/vaporizer/catalytic-reactor/igniter allows pre-reforming liquid hydrocarbon fuels without the need for external pre-heat or complete pre-vaporization. The reactor permits a simplified fuel injection, mixing and vaporization approach reducing the predisposition to coking when using such fuels by taking advantage of a catalytic reaction and rapid mixing within the catalyst bed. One such catalytic reactor comprises catalytically coated, short-contact-time, ultra-short-channel-length substrates such as those disclosed in U.S. Pat. No. 5,051,241; the contents of which are incorporated herein by reference, particularly the teachings at Column 2, line 47 through Column 4, line 55. One such means is commercially available from Precision Combustion, Inc., as Microlith™. This technology provides the ability to impede soot formation kinetics, increase diffusive capabilities to boost mixing, and provides high surface area to augment vaporization.

2. Brief Description of the Related Art

Vaporization of liquid fuels (e.g., alcohols, hydrocarbons) typically is achieved by indirectly supplying heat into a stream of liquid fuel via heat exchange with a hot wall. One disadvantage of this method is that the rate of vaporization is limited by the rate of heat transfer such that relatively large surface area is required for fuel vaporization. Another disadvantage of this method, especially for vaporizing long chain hydrocarbons, is that heating the fuel stream to the vaporization temperature tends to cause fuel decomposition and formation of deposits. More specifically, coke formation is problematic. Moreover, preventing deposits from forming within the fuel passages in the nozzle during steady state operation due to heat-up of the nozzle from the downstream hot zone is challenging.

Another known method for gasification of a fuel stream comprises mixing atomized fuel with a hot gas such as superheated steam that supplies the heat required for fuel vaporization and prevents coke formation. However, the large amounts of superheated steam required in this method result in a large heat load for steam production.

Spray methods for atomization of liquid fuels known in the art include air-blast or pressure atomizers, ultrasonic and electrospray atomizers. These spray systems are capable of providing a uniform distribution of atomized fuel across the entrance of the catalyst bed. Such atomizers may include a co-flow of air that allows mixing of the fuel and oxidizer. However, very fine and uniform droplet size along with homogeneous fuel-air distribution, required to avoid coke formation and obtain temperature/mixture uniformity in the reactor, is difficult to achieve in practical systems.

Ignition devices, such as a spark or glow plugs, are widely used to ignite fuel-oxidizer mixtures at startup. These devices often are subject to failure due to the high operating temperatures by virtue of their location required for ignition.

Monoliths are commonly used catalyst substrates for the gasification of liquid fuel. Fuel oxidizer mixture inhomogeneities are usually detrimental to these substrates as they lead to localized lean or rich zones respectively causing hot spots or carbon precipitation regions. Since there is no opportunity for these zones to re-mix within the long, separated channels of a monolith, these substrates are particularly vulnerable. In addition, carbon precipitation is favored in monoliths due to the boundary layers that develop in these substrates.

Combustion of liquid fuels in fuel cell or internal combustion engine systems poses significant problems, especially for fuels with high aromatic content and wide boiling point distribution. This can be attributed to the propensity of the heavier aromatic compounds in the fuel to form deposits or coke when vaporized at high temperatures. Accordingly, there is a need for a pre-reforming reactor capable of operating with a range of liquid fuels. It is therefore an object of the current invention to provide a pre-reforming reactor for partially oxidizing and cracking the heavy components of the fuel. The pre-reformed fuel subsequently can be further reformed or combusted to power fuel cell systems, internal combustion engines, burners, and other known devices.

U.S. Pat. No. 4,381,187 to Sederquist (the "'187 Patent") discloses a method in which a partially pre-vaporized fuel stream mixed with air, at an overall equivalence ratio greater than 3, is passed through a monolith catalytic structure thereby achieving gasification of the fuel in the stream. The '187 Patent requires mixing the fuel stream with the heated air stream and partial vaporization of the fuel prior to its introduction into the catalyst bed. Air temperature specified for the method is between 580 and 660° C. Thus, coking may occur. The method of the '187 Patent therefore requires supplying external heat for pre-heating the air. The method of the '187 Patent also requires the catalyst to be in a shape having wall surfaces extending in a downstream direction defining a plurality of parallel cells, for example, a conventional monolith.

This configuration results in a comparatively low conversion rate of the reactants to the desired products. Moreover, in the method of the '187 Patent, the catalyst is chosen such as to initiate and sustain complete combustion, namely oxidation of part of the fuel to $CO_2$ and $H_2O$ releasing heat. The '187 Patent discloses at column 1, line 49, that "once in vaporous form, fuel may be catalytically partially oxidized and reformed in an autothermal catalytic reactor." Therefore, a separate reactor is required if $H_2$-rich gas stream is desired.

It is therefore another object of the current invention to provide a catalyst substrate that facilitates mixing of the stream flowing therethrough, for example a substrate having plurality of voids in random order and short channels extending in the downstream direction the length of which is similar to the channel diameter. Such a configuration results in a comparatively high conversion rate of the reactants to the desired products and minimizes break through of unreacted fuel. It also is an object of the current invention to provide a catalytic reactor for the gasification of liquid fuels comprising a catalyst that yields partial oxidation products, such as CO and $H_2$. This results in a higher level of fuel conversion for the same amount of added air and produces hydrogen-rich gas directly from the gasifier reactor. It is a further object of the current invention to provide a method whereby steam or atomized water and/or $CO_2$ may be added to the fuel/air stream to adjust the amount of hydrogen in the product stream. It also is a further object of the current invention to provide a method whereby no external pre-heating of either air or fuel is required.

The dependence of fuel conversion on oxygen-carbon ratio (O:C) is known to one skilled in the relevant art. Tests of a conventional gasifier comprising a catalytic reactor and prevaporized, premixed fuel and air inlet indicated a linear increase in fuel conversion with increasing air. With increased air, or a higher O:C, the catalyst temperature increased and higher fuel conversion can be achieved, though at the expense of higher heat release and higher catalyst temperatures. It thus is a further object of the current invention to provide a method whereby gasification of liquid fuels is achieved employing a fuel-rich fuel air mixture with an O:C ratio suitable for efficient fuel conversion.

DESCRIPTION OF THE INVENTION

It has now been found that vaporization of the inlet fuel can be accomplished by passage through the central inlet tunnel of an operating outward flow, radial flow, exothermic catalytic reactor. A preferred system according to the present invention comprises a cooled fuel injector, a short-contact-time, ultra-short-channel-length substrate catalytic reactor, and an ignition device (e.g. glow plug). The liquid fuel and air (atomizer air and secondary air) are injected into the tubular center axial flow hot box for vaporization of the fuel droplets before the droplets strike the catalyst bed. Another embodiment of the present invention comprises the use of a coiled, radial flow, short-contact-time, ultra-short-channel-length substrate catalytic reactor. The advantages of such a configuration are disclosed in U.S. patent application Ser. No. 10/324,464 filed Dec. 19, 2002, the contents of which are incorporated herein by reference, particularly the teachings at Paragraphs 0014-0031 including FIGS. 1 and 2.

In most applications, oxygen as a constituent of air is a preferred oxidizer. The ratio of the fuel stream to the oxidizer stream should be such that there is insufficient amount of oxidizer to completely oxidize all the fuel, namely, the ratio should be fuel rich. According to the method of the present invention, an air stream, into which the liquid fuel is atomized, may be at any temperature, either hotter or colder than ambient temperature. It was found that heat generated in the catalyst bed is sufficient to support fuel vaporization at the level required for stable oxidation reactions to proceed throughout the catalyst bed.

The catalyst bed comprises a catalyst suitable for supporting partial oxidation reactions. Preferably, the catalyst should be one of the metals of group VIII of the periodic system of elements. The substrate on which the catalyst is supported preferably provides good mixing for the fuel/oxidizer mixture passing therethrough. To provide good mixing capabilities, the substrate preferably comprises a multiplicity of void volumes in random order. This may be best achieved by using porous metal or ceramic substrates, or by using multiple ceramic or metal screens or foams.

It is preferred that the rate of flow of fuel and oxidizer into the catalyst bed is sufficiently high such that significant amount of partial oxidation products, namely CO and $H_2$, are formed. When partial oxidation products are formed, less heat is released resulting in lower catalyst bed temperatures. In another embodiment of the present invention, water in the form of liquid or steam may be added to the fuel/oxidizer stream entering the catalyst bed to help control the catalyst bed temperature, the degree of fuel conversion in the catalyst, and the exit mixture composition.

The method and system of the present invention provide gasification of liquid fuel without a requirement for supplying external heat or steam to the gasifier. Fuel and air may be supplied to the gasifier at ambient temperatures. This allows a smaller mixing volume, since the catalytic bed tolerates partial unmixedness, and a simpler fuel and air delivery system design. This also allows a means for start up and initial operation in the absence of heat at the reactor inlet.

DETAILED DESCRIPTION OF THE INVENTION

Figure 1:
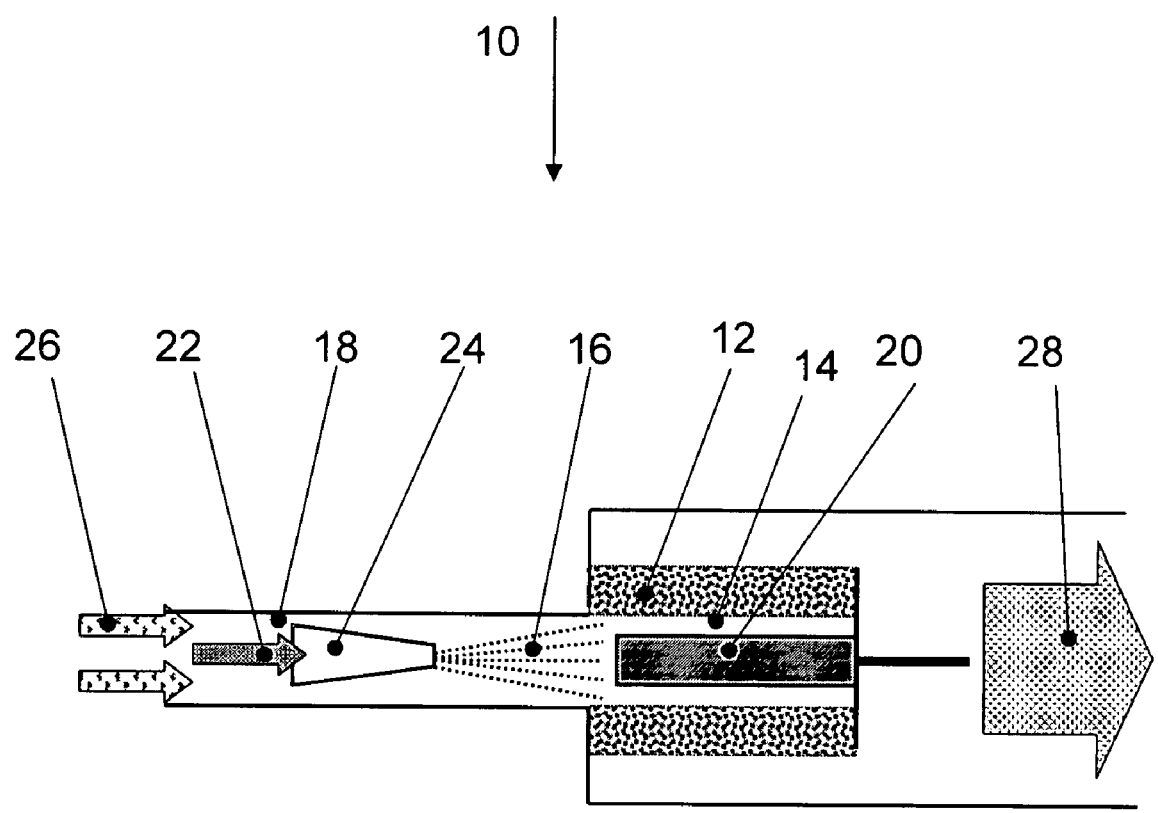
FIG. 1 depicts a schematic representation of an embodiment of a gasification system according to the present invention.

A gasification system (10) according to the present invention is depicted schematically in FIG. 1. In this embodiment, catalyst bed (12) defines a cylindrical shape and comprises a wound catalytically coated, short-contact-time, ultra-short-channel-length substrate surrounding an axial flow thermal hot box vaporization chamber (14). Atomized fuel (16) and airflow (18) enter into hot box (14) and vaporized fuel and air flow out radially through catalyst bed (12). An igniter may be used to assist in the start up process of the system. In this embodiment, the igniter comprises an electric glow plug (20) placed inside hot box (14). The glow plug (20) may be coated with catalyst to further assist the start up process. Electric current initially is supplied to glow plug (20) to preheat catalyst bed (12) to the start up temperature. Fuel stream (22) is then introduced into injector (24), and air (26) is then mixed with atomized fuel (16) causing catalyst bed (12) to heat up to the operating temperature at which point the electric current to the glow plug (20) is stopped. Gasified fuel stream (28) exits the system (10).

A catalytic reaction method according to the present invention may provide partial oxidation products including gasification for hydrogen production. Such a gasification method also could be used for partially or completely reforming gaseous fuels. This improves fuel properties for many downstream applications, such as minimizing soot formation in fuel combustion or producing reformed fuels for use with fuel cells, such as solid oxide fuel cells. Water or steam and/or other components may be added to the fuel and air stream in other embodiments of the present invention to optimize the performance or the reforming reaction and to adjust the composition of the product mixture.

Figure 2:
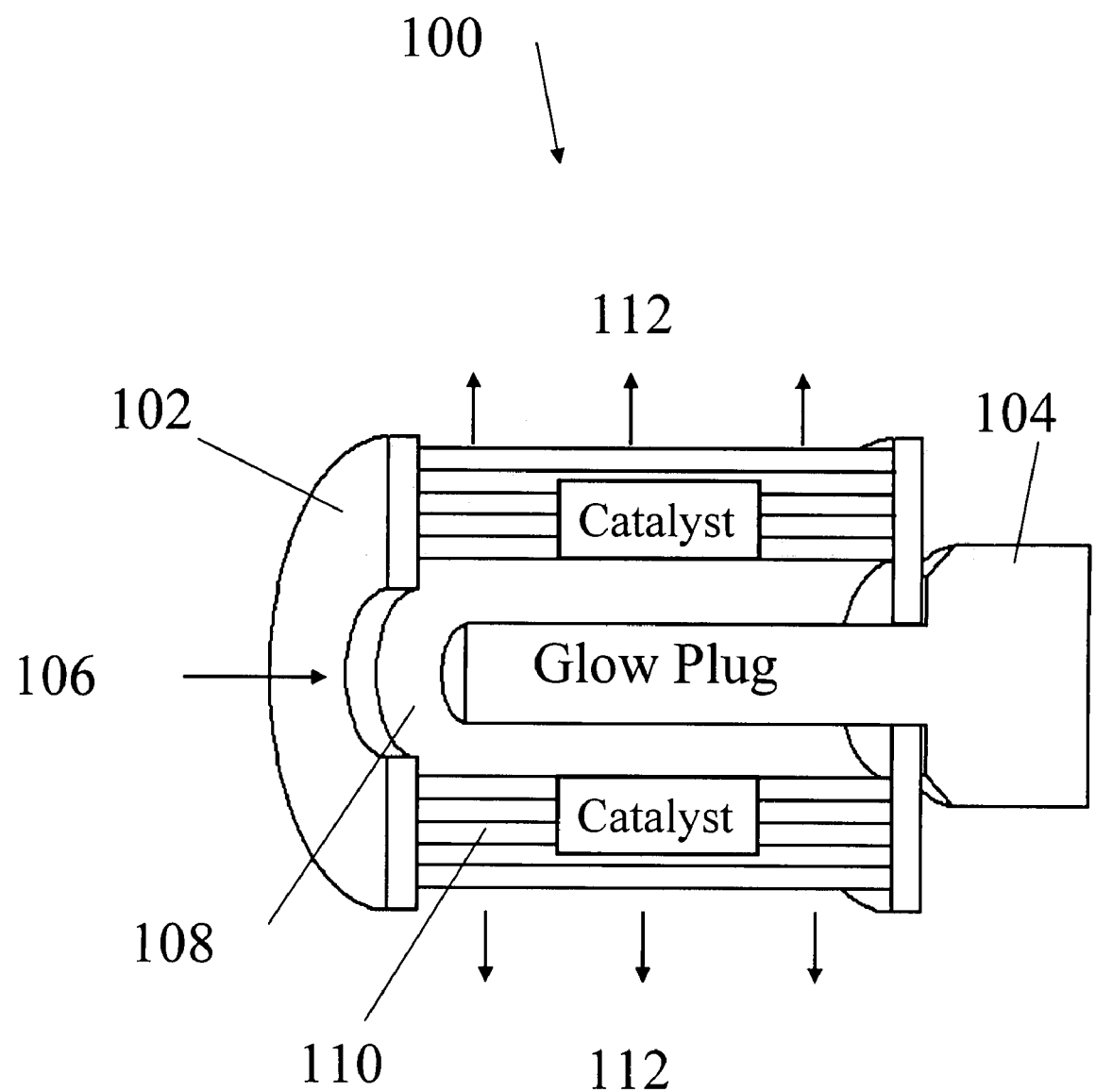
FIG. 2 depicts a cutaway representation of a hot box chamber according to the present invention.

As more simply illustrated in FIG. 2, a hot box chamber (100) according to the present invention comprises a catalytic reactor (102) and an ignition device such as a glow plug (104). The liquid fuel and air (atomizer air and secondary air) are injected into the tubular center (106) axial flow hot box (108) for vaporization of the fuel droplets before the droplets strike the catalyst bed (110). Gasified fuel stream (112) exits the catalyst bed (110).

Although the invention has been described in considerable detail, it will be apparent that the invention is applicable to many different catalytic reactions and is capable of numerous modifications and variations, apparent to those skilled in the art, without departing from the spirit and scope of the invention.

What is claimed:

1. A method for vaporization of a liquid fuel comprising:
   a. providing a supply of a liquid fuel;
   b. providing a supply of an oxidant;
   c. atomizing the liquid fuel;
   d. mixing the atomized fuel with the oxidant;
   e. passing a resulting mixture of atomized fuel and oxidant into a radiation hot box comprising an ignition source positioned inside a coiled catalytic reactor comprising an ultra-short-channel-length reactor substrate, wherein the catalytic reactor further comprises a plurality of the substrates thereby providing void volumes in random order; and
   f. igniting the catalytic reactor with the ignition source, and catalytically reacting the atomized fuel oxidant mixture on contacting the reactor substrate so as to generate thermal radiant energy to vaporize the liquid fuel.

2. The method of claim 1 wherein the liquid fuel comprises hydrocarbons.

3. The method of claim 1 wherein the oxidant is a constituent of air.

4. The method of claim 1 comprising the additional step of introducing water to the fuel oxidant mixture.

5. The method of claim 4 wherein the water is introduced in the form of steam.

6. The method of claim 1 wherein the step of mixing the atomized fuel with the oxidant further comprises forming a fuel rich fuel oxidant mixture.

7. The method of claim 1 wherein in step (e) the catalytic reactor further comprises providing a catalyst on at least a portion of the substrate, the catalyst comprising one of the metals of group VIII of the periodic system of elements.

8. The method of claim 1 wherein the substrate is mounted to avoid bypass of the substrate by the fuel oxidant mixture.

9. The method of claim 1 wherein in step (e) the ignition source comprises a glow plug.

10. The method of claim 1 wherein the step of catalytically reacting the fuel oxidant mixture includes partially oxidizing the fuel oxidant mixture with production of exothermic heat of reaction.

11. The method of claim 1 wherein the mixture of atomized fuel and oxidant flows axially into the radiation hot box and radially through and out of the coiled catalytic reactor.

12. The method of claim 1 wherein after igniting the catalytic reactor, the ignition source is shut-off.

13. The method of claim 1 wherein the process is conducted in the absence of heat at an inlet where the fuel and oxidant are fed into the reactor.

* * * * *